March 9, 1943.    R. SUCZEK    2,313,279
UNIVERSAL JOINT
Filed Aug. 1, 1938    3 Sheets-Sheet 1
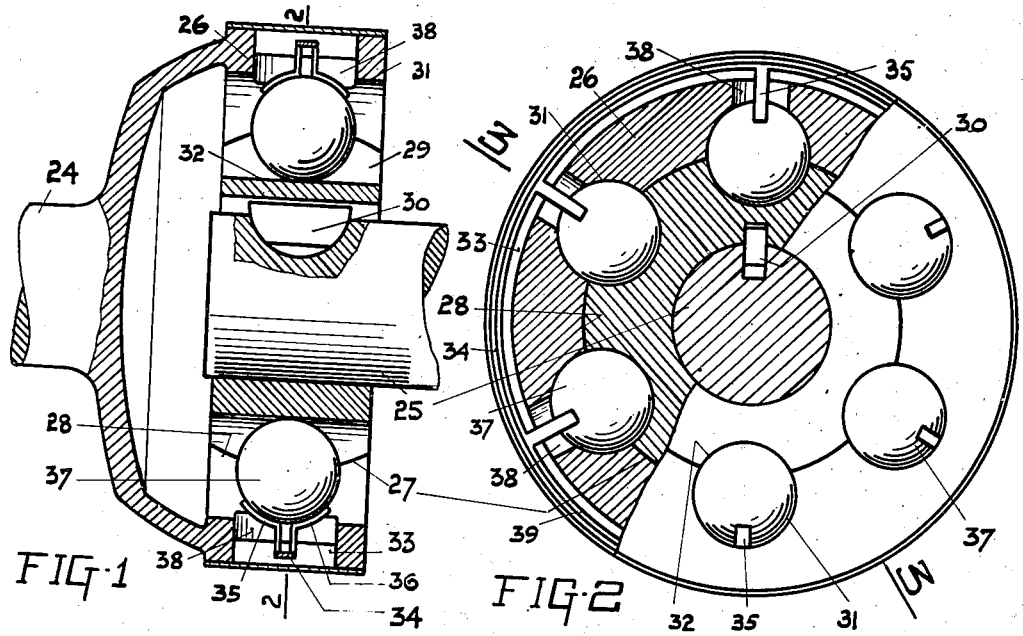
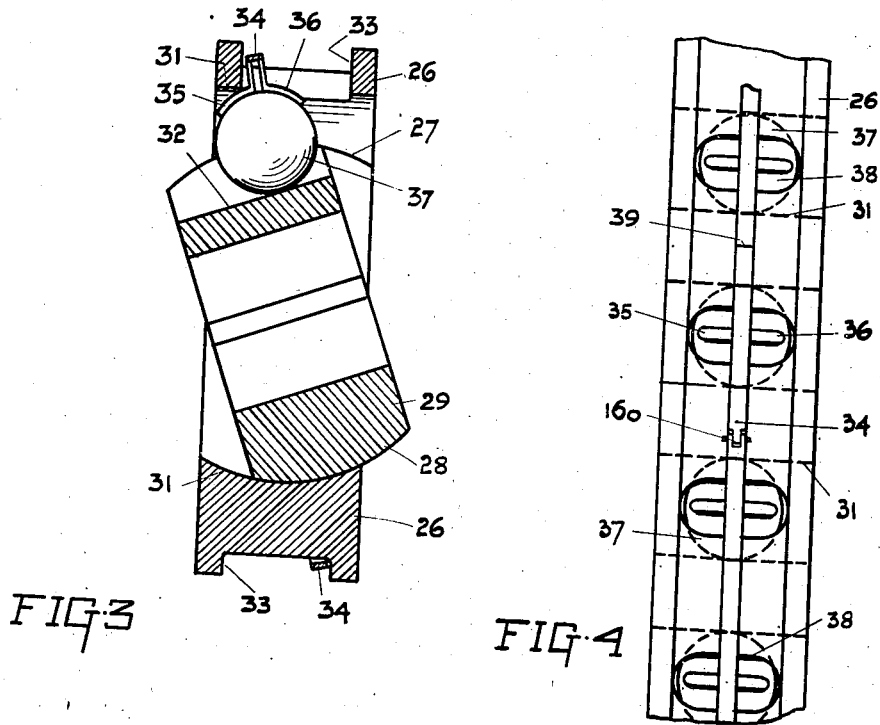
INVENTOR.
Robert Suczek

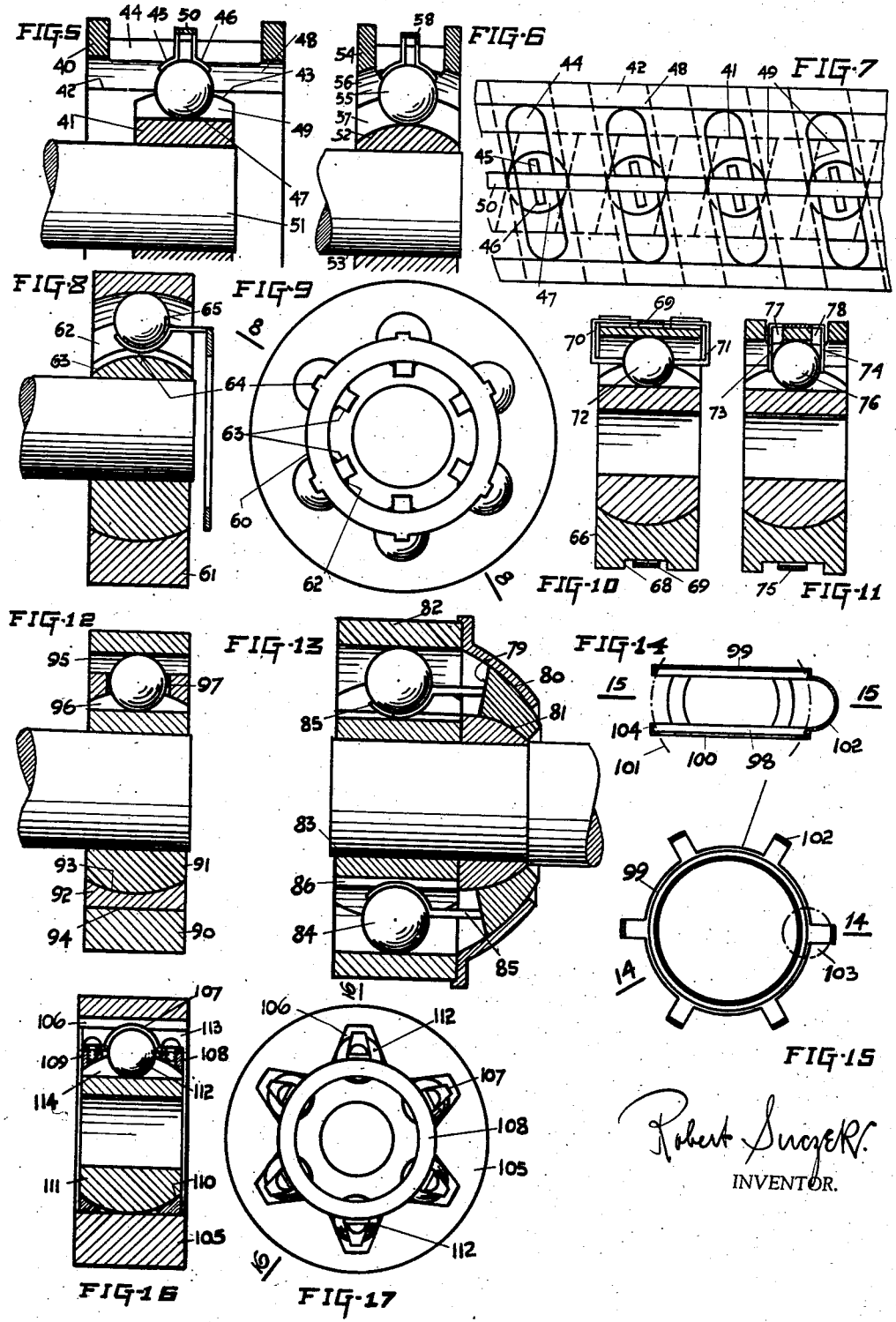

March 9, 1943.　　　　R. SUCZEK　　　　2,313,279
UNIVERSAL JOINT
Filed Aug. 1, 1938　　　3 Sheets-Sheet 3
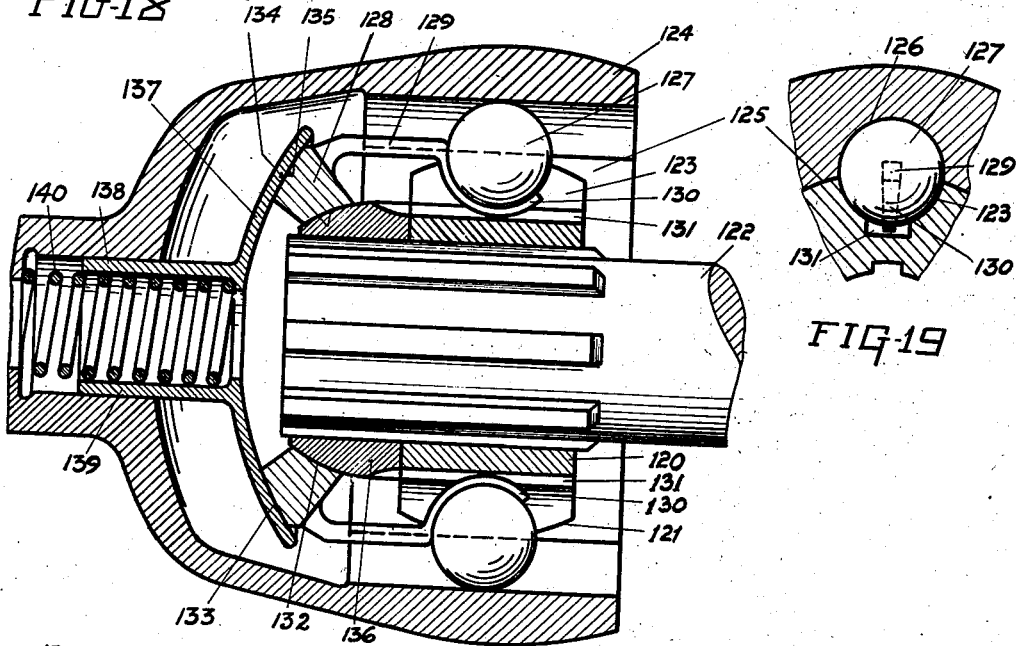
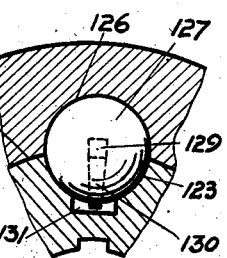
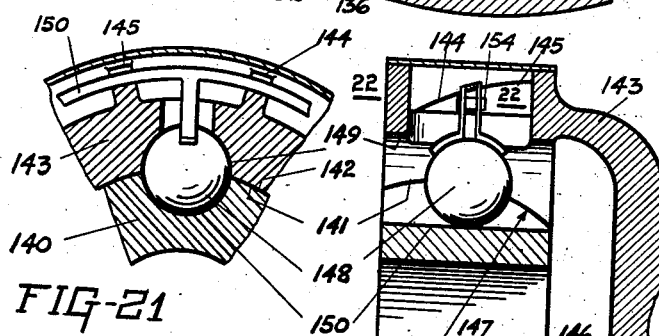
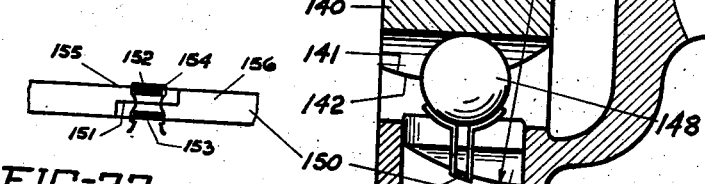
INVENTOR.
Robert Suczek.

Patented Mar. 9, 1943

2,313,279

UNITED STATES PATENT OFFICE 2,313,279

UNIVERSAL JOINT

Robert Suczek, Grosse Pointe, Mich.

Application August 1, 1938, Serial No. 222,409

11 Claims. (Cl. 64—21)

This invention relates to universal joints of the constant velocity type in which the torque is transmitted by balls.

Good joints of this type are costly and are therefore used very sparingly, particularly by the automotive industry. The high cost of these joints is mostly due to the design of the cage for retaining and regimenting the balls.

The primary object of the present invention is therefore, to provide a universal joint of the constant velocity type involving a new and improved means for retaining the balls.

According to my invention, the driving balls interposed between the driving and driven members are positively controlled, so that each ball transmits an equal share of the load by a very simple cage which is arranged outside and/or around the outer ball race member instead of within the outer race member.

The new type ball cage, according to this invention does not require any accurate close machining at all, it is stamped out of sheet metal and assembled by snapping it into its place.

Thus closely fitted surfaces are only on the outer and inner race members; this of course has another advantage with joints where the complementary spherical surfaces have to take up considerable thrust forces.

Inaccuracies in machining of the engaging and thrust loaded spherical surfaces will not multiply with my new cage as they do where two (2) pairs of complementary spheres are involved.

By removing the cage from between the two ball race members and bringing the spheres of the torque transmitting members into direct contact, I cut the lost motion due to inaccurate machining into half.

Another object of my invention is to provide a cage which will allow axial displacement of the torque transmitting members and hold the driving balls always in the right place.

The joints according to my invention, due to the externally arranged cage will permit not only the greatest angular but also axial displacement of the shafts relative to each other.

My invention consists in providing apertures or recesses in the grooves of the raceway members through which prongs are inserted for holding the balls. It further consists in connecting these prongs from each groove to the cage proper, a common annulus, located outside the outer race member.

My invention also consists in adapting the cage to the combination of a cylindrical and spherical ball race member, so that the cage will fit the inner spherical member on the inside and to the cylindrical outer member on the outside.

The advantages of my new cage type and its modifications and applications are numerous. It permits axial displacement and great angularity; it is simple and cheap to produce by mass production; easy to assemble and easy to disassemble.

It may be understood that some of the particular constructions and arrangements described and shown, have been shown for illustrative purposes only, and that the invention as defined by the claims hereunto appended may be otherwise embodied without departure from the spirit and the scope of the present invention.

With these and other advantages and objects of my invention in view, together with means whereby the same may be carried out, my invention consists in the arrangement, construction and combination of various parts of my new device and method of operation as described in the following specification, claimed in the claims and illustrated in the accompanying drawings in which:

Fig. 1 is a longitudinal section through a joint with a possible embodiment of my cage according to my invention in which the torque or ball race members are fitted together on spherical surfaces.

Fig. 2 is a cross section of Fig. 1 along lines 2—2 partly in view.

Fig. 3 is a section through the joint of Fig. 1 along line 3—3 of Fig. 2 showing the torque members and the cage angularly displaced relative to each other.

Fig. 4 is a developed view of the spherical surfaces of Fig. 1 showing also the developed cage, the grooves and the apertures or recesses through which the prongs of the cage reach in holding the balls.

Fig. 5 is a part of a longitudinal section through a joint according to my invention with a cylindrical outer and a spherical inner race member and the new cage permitting a great axial displacement of the members.

Fig. 6 is a part of longitudinal section through a modified joint according to my invention with spherically engaged surfaces and concentric grooves.

Fig. 7 is a developed view of the cylindrical inner surface of the outer member of Fig. 5, illustrating the location of the balls in crossed grooves and the developed cage, according to my invention.

Fig. 8 is a longitudinal section through a joint according to my invention with a somewhat modified cage with prongs reaching around the balls through recesses in the inner torque member.

Fig. 9 is a side elevation of Fig. 8.

Fig. 10 illustrates a modified cage according to my invention surrounding the outer member.

Fig. 11 is another possible modification of the cage.

Fig. 12 is a longitudinal section through a joint according to my invention, in which the outer member is cylindrical on the inside and the inner member spherical on the outside with a cage adapted to both these members.

Fig. 13 is a longitudinal section through a joint according to my invention illustrating means to angularly move the cage.

Fig. 14 is a longitudinal section through a modified cage according to my invention.

Fig. 15 is a cross section through Fig. 14 along line 15—15.

Fig. 16 is another modified design of a cage according to my invention for a pair of torque members, one with a spherical the other with a cylindrical surface.

Fig. 17 is a side view of Fig. 16.

Fig. 18 is a longitudinal section through a joint according to my invention in which the cage is guided for angular and for longitudinal displacement.

Fig. 19 is a fractional transverse section of Fig. 18.

Fig. 20 is another embodiment of my invention which it may take, illustrating the new cage and its controlling influence on the balls through the grooves, the torque member surfaces and the cage bearing surface.

Fig. 21 is a fractional section through Fig. 20.

Fig. 22 is an illustration of one of the many possible locking means of the cage annulus according to my invention.

In Fig. 1 the numerals 24 and 25 indicate the two torque transmitting shafts coupled together for rotation by the joint. Shaft 24 is shown integral with the outer member 26 having a spherical surface at 27 engaging slidably the spherical surface 28 of the inner member 29 which is keyed to shaft 25 by key 30 or some other desirable or suitable means.

The ball receiving grooves 31 of the outer ball race member 26 and the ball receiving grooves 32 of the inner ball race member 29 are both straight and running in meridian planes in relation to the axes of rotation of the respective spherical members 24 and 25. The outer member 26 is provided with a peripheral groove 33 in which the cage 34 is located. Prong pairs 35 and 36 extending inwardly from the cage or annulus 34 reach around the balls 37 and keep them in permanent alignment required for rapid high speed operations without binding of the members 24 and 25.

The prongs 35 and 36 reach to the balls 37 through apertures 38 having a width smaller than the diameter of the balls.

The annular cage 34 is a resilient member and split at 39. After the two members 26 and 29 and the balls are assembled the cage 34 is expanded and slipped over the outer member 26 into groove 33. The prong-pairs are each set into their respective apertures 38 and placed over the balls.

The straight grooves direct the balls in their rolling motion and the cage in turn prevents the balls from leaving the grooves, following the balls in their oscillating motion to the left and right during each shaft rotation as long as the shafts are set at an angle.

Fig. 5 illustrates a joint for a great longitudinal displacement of the ball race member. The outer member 40 is cylindrical on the inside, while the inner member 41 is spherical at 43 and slidably fitted into the cylinder 42. Member 40 is shown about twice as long as member 41 in order to take care of the axial displacement required by this joint. Fig. 7 is a development of the cylindrical surface 42 illustrating the apertures 44 through which prongs 45 and 46 are inserted and placed about the balls 47. The grooves 48 in member 40 are straight and set at an angle to the axis, and grooves 49 of the inner member 41 are also straight and also inclined but so that they cross with grooves 48 in all positions of the race members.

50 is the cage mounted around the outer race member. The inner race member 41 is locked to shaft 51 for rotation and axial motion, and if the shaft moves axially it moves the ball member along with it and, due to the crossed grooves the balls 47 will also move with the ball member, and with it the cage 50, keeping the balls in their alignment, required for the correct smooth functioning of the joint. Fig. 6 is another modification of the joint according to my invention, the members are both spherical and the spheres fitted together in direct contact. The grooves may be crossed or they may be meridian. 52 is the inner member mounted on shaft 53, and surrounded by the outer member 54. The balls 55 move in curved grooves—56 and 57—and are regimented by cage 58. This joint is used for small angular shaft displacements and no axial relative motion of the members 54 and 52.

Figs. 8 and 9 illustrate a modified cage according to my invention. The cage annulus 60 is located well outside of the joint but does not surround the outer member 61. The apertures 63 for the prongs of the cage are not in the outer member but in the grooves 62 of the inner member. The prongs 64 reach from cage annulus 60 into the apertures and reach about the balls 65 far enough to securely hold them in their places.

Figs. 10 and 11 illustrate possible embodiments of my new cage. Outer member 66 of Fig. 10 has a peripheral groove 68 in which the cage annulus 69 is laid. The prongs 70 and 71 do not reach to the balls 72 through any apertures but around the outer race member. In Fig. 11 the prongs 73 and 74 carried by cage 75 reach to the balls 76 through separate apertures 77 and 78 respectively.

The cage in Fig. 13 is somewhat as that in Fig. 8 but the annulus 79 is provided with two spherical segmental non-concentric surfaces 80 and 81 in engagement with complementary spherical surfaces; one of these latter attached to the outer member 82, the other to the inner member 83. This is for the actuation of the cage and the balls 84 regimented by it. The prongs 85 reach through apertures 86 around the balls 84, the apertures 86 being located in the inner member 83.

The cages shown in Figs. 12, 14, 15, 16 and 17 are adaptations to suit the combination of a cylindrical outer member and a spherical inner member with channels or apertures in the ball grooves for receiving the cage, the cage being located within the outer member and surrounding the inner member. In Fig. 12, 90 is the outer cylindrical member and cage 92 is fitted on a spherical surface 93 to the member 91 and on a cylindrical surface 94 to the member 90. The grooves 95 and 96 are preferably straight and the balls are held in holes 97 of cage 92.

A joint according to Fig. 12 permits angular and longitudinal displacement and may be used for greater transverse loads, like a bearing.

Figs. 14 and 15 illustrate a cage 98 made from sheet metal in one piece. Base rings 99 and 100 are fitted to the inner ball member 101 (dotted line) and straps 102 surround the balls 103. Shoulders 104 fit on the cylindrical surface of the outer member. The cage in Figs. 14 and 15 will fit between the ball race members as illustrated in Fig. 16. There 105 is the outer cylindrical race member with straight grooves 106 so deep that room is left for the straps 107 replacing the prongs of Fig. 1. These straps are screwed to two rings 108 and 109 resting on the spherical surface 110 of the inner ball race member 111. The balls 112 roll in straight grooves 113 and 114 which have flat walls, so that balls 112 are contacting them in points only.

Cages shown in Figs. 14-15, 16 and 17 are simple and cheap to produce and are easy to assemble and to install.

Fig. 18 and Fig. 19 illustrate a joint for an exceptionally long axial displacement.

The inner member 120 is spherical at 121 and locked for rotation and axial movement to shaft 122. It is provided with straight ball receiving grooves 123. The outer member 124 is cylindrical on the inside at 125 and is provided with axial straight grooves 126 in which balls 127 roll. The ball cage 128 is provided with arms 129 which surround partly the balls at 130 between the inner member and the balls. These prongs 130 are located in recessions 131.

Cage ring 128 has two spherical surfaces 132 and 133 each with a different center. Surface 132 is in contact with a spherical surface 134 of equal radius and surface 133 is in contact with another spherical surface 135 of equal radius.

Surface 134 is on a member 136 keyed to shaft 122 and surface 135 is on a member 137 which is axially guided in member 124 at 138 by a cylindrical portion 139 and pressed by a spring 140 against the cage ring surface 133, in all axial positions of the inner member 120 and shaft 122.

Through the differential action of the surfaces 134 and 135 the cage 128 is oscillated angularly and the spring moves the cage with the shaft 122 axially so that the balls are always riding on the crest of member 120.

It may be noted that both grooves 123 and 126 are straight and meridian, that is parallel to the axes of the shafts of the ball race members 120 and 124.

In Figs. 20 and 21 I have illustrated another modification of my new cage and of the joint in which the cage is forced to move in a certain desired angular relation to the ball race members. The inner ball race member 140 is spherically fitted with its outer surface 141 into a sphere 142 of the outer ball race member 143. The cage 150 is placed around member 143 on a spherical surface 144 which may either be fully circular or as indicated only on ribs 145.

The spherical surface 144 has its center at 146 and the spherical surface 142 of the outer ball race member 143 has its center at 147. According to the distance of these two centers the cage will be forced to oscillate angularly through a part of the angular displacement of the members 143 and 140, in synchronism with the balls 148.

In joint illustrated in Fig. 20 the ball receiving grooves 149 and 150 are straight and parallel to the axes of the shafts of members 140 and 143 respectively; and the joint may be used with advantage where no axial displacement is required.

Fig. 22 illustrates a possible embodiment of a locking device of the split in the ball cage of Fig. 21.

The annulus 150 is split in a zig-zag cut at 151 so that one of the pair of prongs 152 and 153 is on each end 155 and 156 of the split. Spring 154 suitably shaped is snapped about the two prongs 152 and 153 so that the ends 155 and 156 of the cage 150 are held together.

Another possible cage lock is shown in Fig. 4. The ends are tailed like at 160 and pinned together with a suitable pin 161. This pin may be either a cotter pin or it may be threaded.

As mentioned above the ball cage is snapped into place when assembling. It may be understood that this is possible because the prongs of the cage are resilient and in order to assemble them and the balls into the inner or outer member or both, the prongs must be preloaded in order to be snapped in.

What I claim is:

1. The combination with a pair of shafts, a universal joint connection therefor comprising an outer ball race member, an inner ball race member removably receivable within the outer ball race member said ball race members provided with corresponding grooves, balls in said grooves coupling said members together for rotation, means to lock the outer ball race member to one of said shafts and means to lock the inner ball race member to the other shaft, recessions in said grooves in one of said members, a cage mounted at least about one of said members, and means carried by the cage for retaining the balls in their grooves, said last means reaching through said recessions to opposite sides of the balls.

2. The combination with a pair of shafts, a universal joint connection therefor comprising an outer ball race member, an inner ballrace member removably receivable within the outer ball race member, said ball race members provided with corresponding ball receiving grooves, balls in said grooves coupling said members together for rotation and held in their grooves by a retainer, recesses in the grooves of at least one of the members and means projecting into said recesses for holding the balls, the grooves in both members being straight.

3. A universal joint comprising an outer member and an inner member locked together by balls for rotation, the inner member having a spherical surface and the outer member a cylindrical surface with the inner member removably receivable within the cylindrical surface, a unit cage for regimentation of the balls able to act on the balls from axially opposed sides and a spring reacting on the member with the cylindrical surface for holding the cage in a desired relation to the spherical member.

4. The combination with a pair of shafts a universal joint connection therefor comprising an outer ball race member and an inner ball race member, said ball race members provided with corresponding ball receiving races, balls in said races coupling said members together for rotation, one of the members being locked to one of the shafts to rotate therewith, the other member being locked to the other shaft for rotation, the races of both members being cylindrical to fit about the balls, the inside member being spherical on the outside, and single means different from the two members for regimenting the balls in their races, said means reaching through recessions in the races to axially opposite sides of the balls.

5. A torque transmitting joint comprising a driving member and a driven member, said members having complemental spherical surfaces concentric with the axis of rotation, pairs of cylindrical complemental ball receiving raceways in said spherical surfaces in crossed relation, the races of the inner member being provided with grooves, a driving ball in each pair of race-ways at the intersection thereof, the spherical surfaces of both members being in direct contact for taking up axial thrust resulting from the torque due to the crossed relation of the raceways, and ball retaining and guiding means different from the two members reaching into said grooves.

6. In combination in a constant velocity universal joint, two main members, one of them having a spherical surface in direct engagement with the other member and driving balls there between, a cage for the regimentation of the balls and resilient means integral with the cage to be under tension while performing oscillatory motion for controlling the ball motions.

7. The combination with a pair of shafts, a universal joint connection therefore comprising an outer ball race member, an inner ball race member removably receivable within the outer ball race member, said ball race members provided with corresponding grooves, balls in said grooves coupling said members together for rotation, means to lock the outer ball race member to one of the shafts and the said inner member to the other shaft, recesses in said grooves in one of said members, a ball controlling member mounted about the race member whose grooves are provided with said recesses, and means carried by the ball controlling member for retaining the balls in their grooves, said last means projecting through said recesses to the opposite sides of the balls.

8. The combination with a pair of shafts, a universal joint connection therefor, comprising an outer ball race member, an inner ball race member removably receivable within the outer ball race member, said ball race members provided with corresponding ball receiving grooves of cylindrical shape, balls in said grooves coupling said members together for rotation and held in their grooves by a retainer, longitudinal recesses in the grooves of the inner member to receive parts of the retainer, said recesses extending through the entire length of the cylindrical grooves.

9. In a universal joint, two members having straight corresponding grooves for receiving balls transmitting torque from one member to the other, a cage for the regimentation of the balls in their respective grooves when the members rotate, and means acting on the cage and imparting thereto angular oscillations harmoniously with the relative motion of the two members, the cage being located on both sides of the balls, and its parts forming a solid unit consisting of one piece, and a spring acting on the cage and tending to hold the cage in desired relation to one of the members.

10. In a universal joint, two members one surrounding the other and having corresponding races for receiving balls transmitting torque from one member to the other, a cage located between the inner and the outer member for the regimentation of the balls in their respective races when the members rotate, and means acting on the cage and imparting thereto angular oscillating motion in harmony with the relative motion of the two members, the cage being located on both sides of the balls, and its parts on both sides of the balls forming a solid unit consisting of one piece with the cage, the races being straight and cylindrical and a spring acting axially in relation to the outer member for holding the oscillations imparting means in contact with the cage.

11. In a universal joint, two members having corresponding races for receiving balls transmitting torque from one of the members to the other, a cage for the regimentation of the balls in their respective races when the members rotate, and means acting on the cage and imparting thereto angular oscillating motions in harmony with the relative motions of the two membrs, the cage being located on both sides of the balls and the said means being under spring pressure, engaging the cage to one of the members for transmission of the angular oscillations, one of the members being spherical on its outside the other cylindrical on the inside, and the grooves being cylindrical and meridian to the axes of their respective members.

ROBERT SUCZEK.